A. W. HAYES & C. D. STEVENS.
COLLECTOR'S RECEIPTING RECORDER.
APPLICATION FILED JUNE 4, 1910.
1,041,624.
Patented Oct. 15, 1912.
6 SHEETS—SHEET 1.
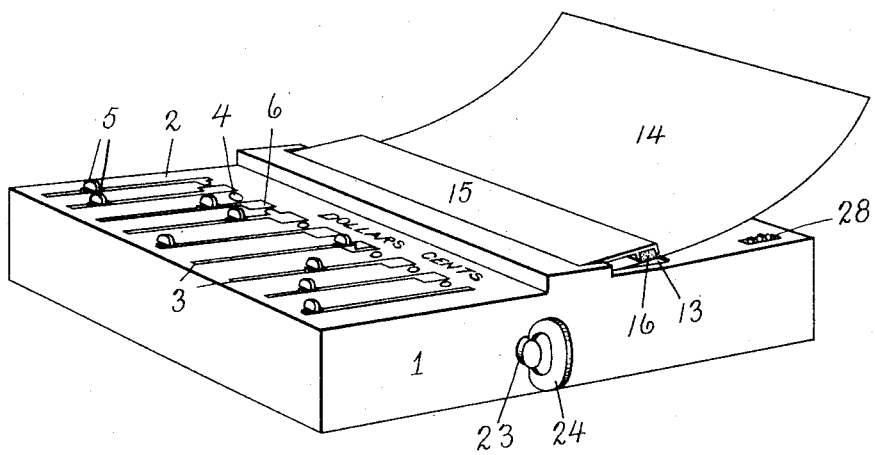
Fig-1-
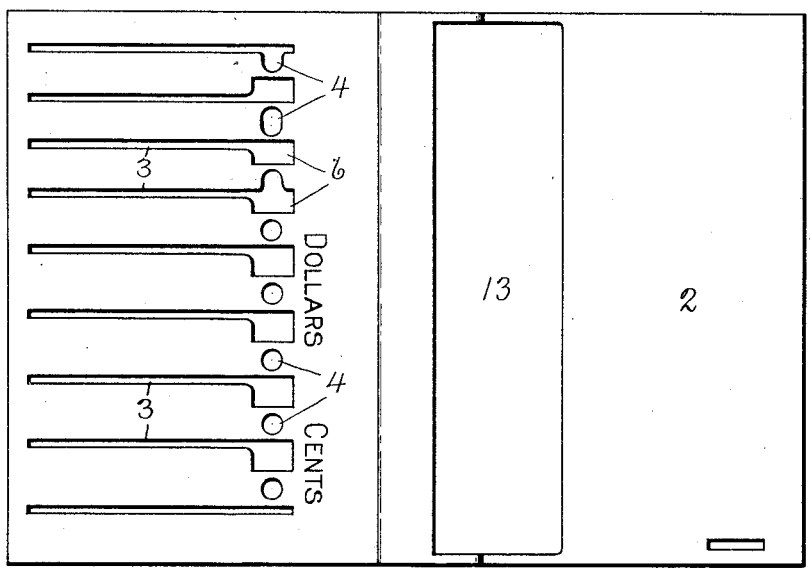
Fig-2-
WITNESSES:
John E. Heller.
Maria K. Beynroth.
INVENTORS.
Arthur W. Hayes,
Clarence D. Stevens,
By Abraham Knobel.
ATTORNEY.

A. W. HAYES & C. D. STEVENS.
COLLECTOR'S RECEIPTING RECORDER.
APPLICATION FILED JUNE 4, 1910.
1,041,624.
Patented Oct. 15, 1912.
6 SHEETS—SHEET 2.
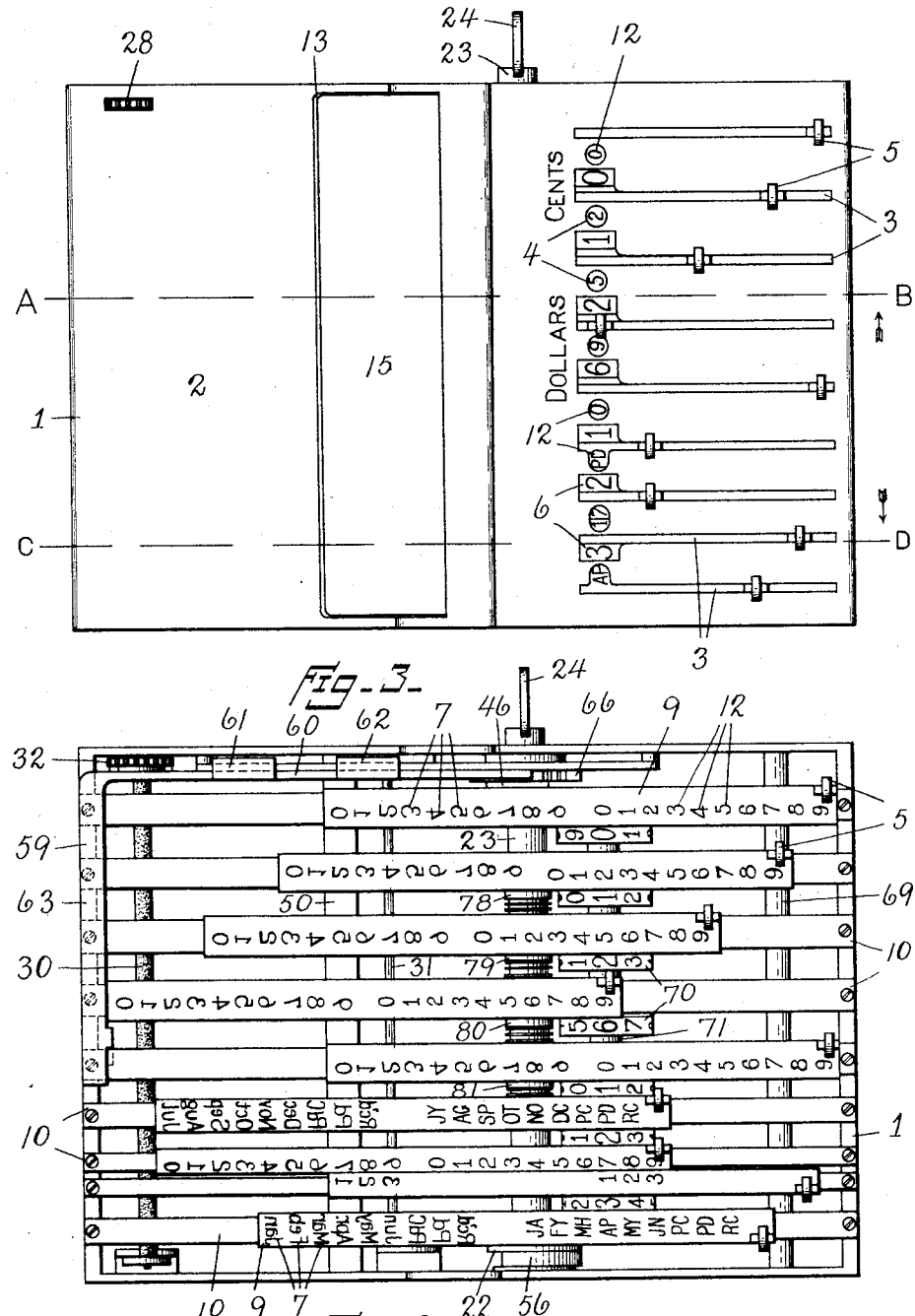
WITNESSES:
John E. Heller.
Maria K. Beynroth.
INVENTORS.
Arthur W. Hayes,
Clarence D. Stevens,
By Abraham Knobel.
ATTORNEY.

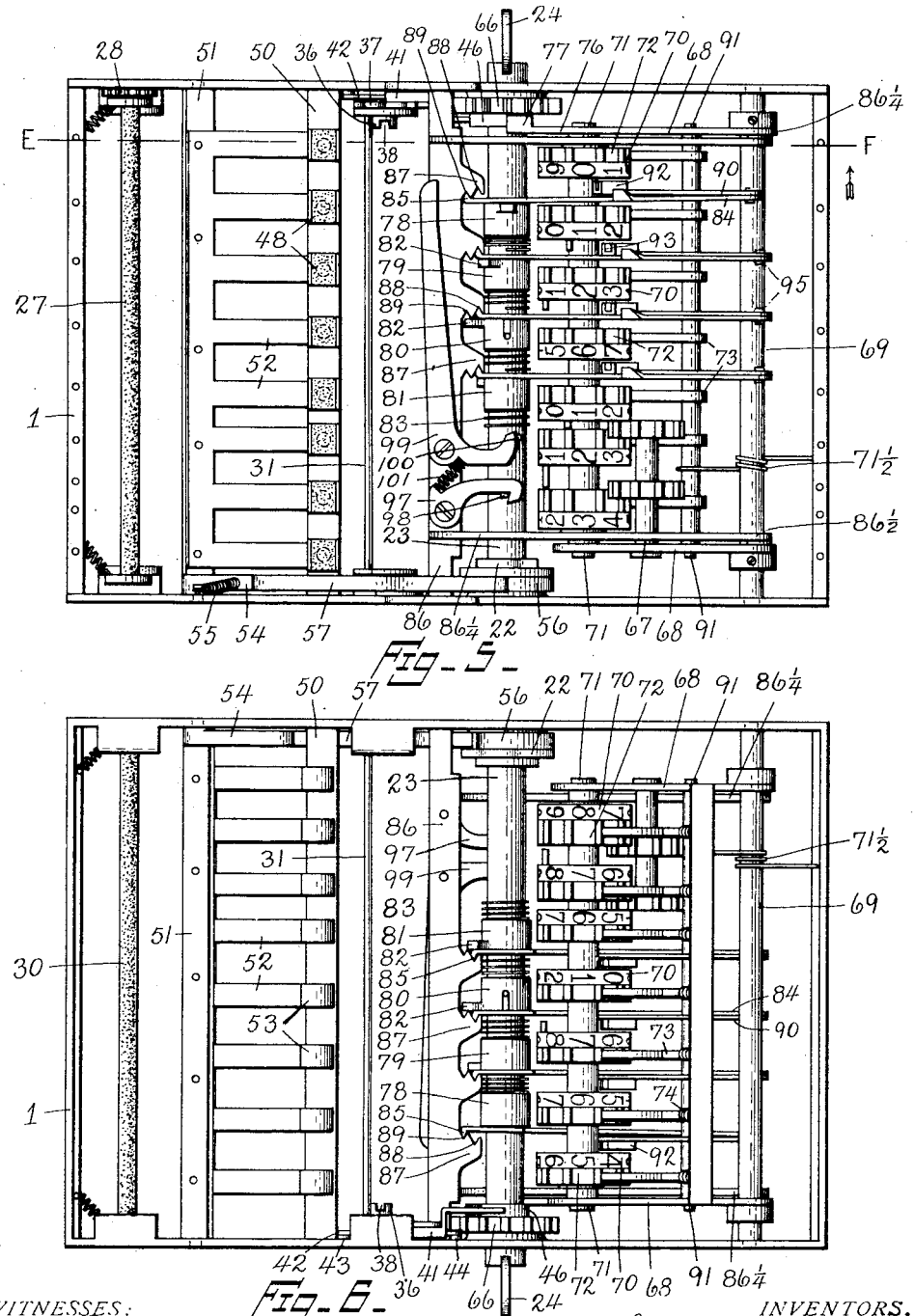

A. W. HAYES & C. D. STEVENS.
COLLECTOR'S RECEIPTING RECORDER.
APPLICATION FILED JUNE 4, 1910.

1,041,624.

Patented Oct. 15, 1912.
6 SHEETS—SHEET 4.

WITNESSES:
John E. Heller.
Maria K. Beynroth.

INVENTORS.
Arthur W. Hayes,
Clarence D. Stevens,
BY Abraham Knobel.
ATTORNEY.

A. W. HAYES & C. D. STEVENS.
COLLECTOR'S RECEIPTING RECORDER.
APPLICATION FILED JUNE 4, 1910.

1,041,624.

Patented Oct. 15, 1912.

6 SHEETS—SHEET 5.

WITNESSES:
John E. Heller.
Maria K. Beynroth.

INVENTORS.
Arthur W. Hayes.
Clarence D. Stevens.
By Abraham Knobel.
ATTORNEY.

A. W. HAYES & C. D. STEVENS.
COLLECTOR'S RECEIPTING RECORDER.
APPLICATION FILED JUNE 4, 1910.
1,041,624.
Patented Oct. 15, 1912.
6 SHEETS—SHEET 6.
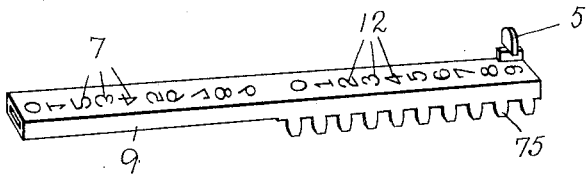
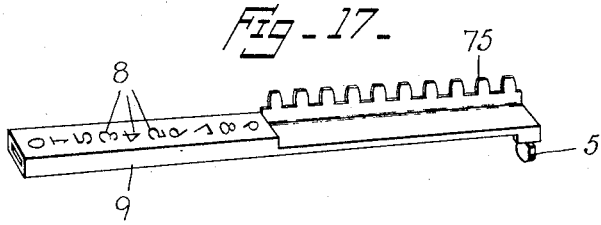
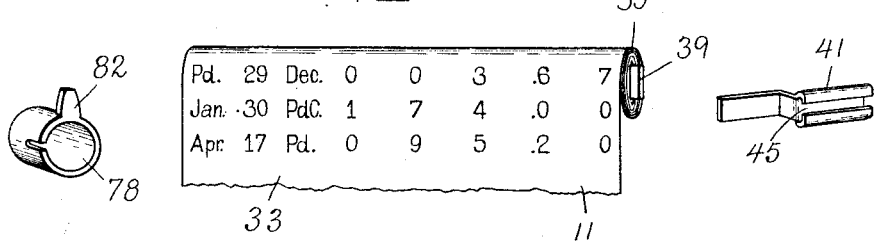
INVENTORS.
Arthur W. Hayes,
Clarence D. Stevens,
By Abraham Knobel.
ATTORNEY.
WITNESSES:
John E. Heller.
Maria K. Beymroth.

UNITED STATES PATENT OFFICE.

ARTHUR WARD HAYES AND CLARENCE D. STEVENS, OF SAN ANTONIO, TEXAS, ASSIGNORS, BY MESNE ASSIGNMENTS, TO SAID CLARENCE D. STEVENS, NOW OF CHICAGO, ILLINOIS.

COLLECTOR'S RECEIPTING-RECORDER.

1,041,624.  Specification of Letters Patent.  Patented Oct. 15, 1912.

Application filed June 4, 1910. Serial No. 565,048.

*To all whom it may concern:*

Be it known that we, ARTHUR W. HAYES and CLARENCE D. STEVENS, citizens of the United States, residing at San Antonio, in the county of Bexar and State of Texas, have invented a new and useful Improvement in Collectors' Receipting-Recorders, of which the following is a specification.

This invention relates to mechanical devices for recording data relative to money received in commercial transactions: and some of the objects of our improvement are, to facilitate the receipting of bills by a collector; to facilitate making a record of the transaction for the use of the office or auditor; to compel both the receipting of the bill, and the making of a record of the transaction by the collector at the time the money is received; to conceal an individual printed record of each separate transaction, together with a total addition of all transactions within the device, to be opened and audited by the office; to give at all times a total of receipts; compactness of the device; lightness; portability; simplicity of construction and operation. These and other objects we attain preferably by means of the mechanism illustrated in the accompanying drawings, in which—

Figure 7:
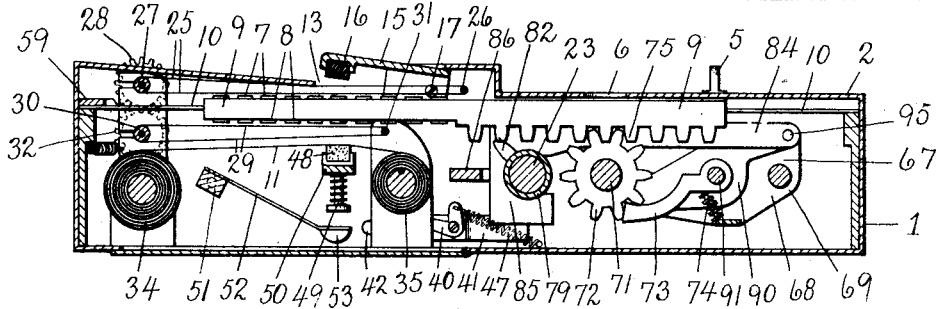
Figure 8:
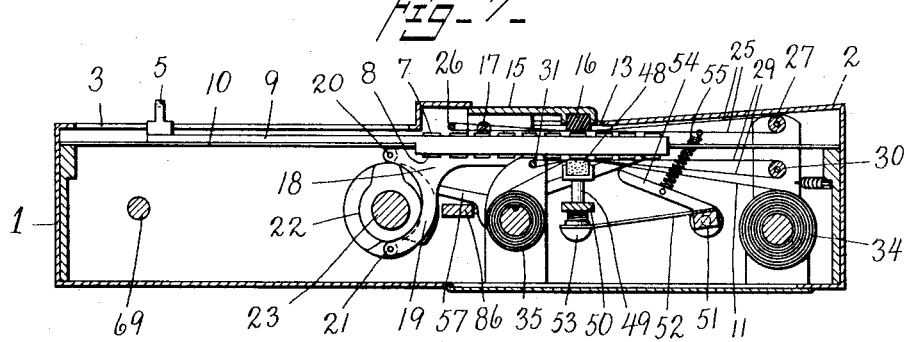
Figure 9:
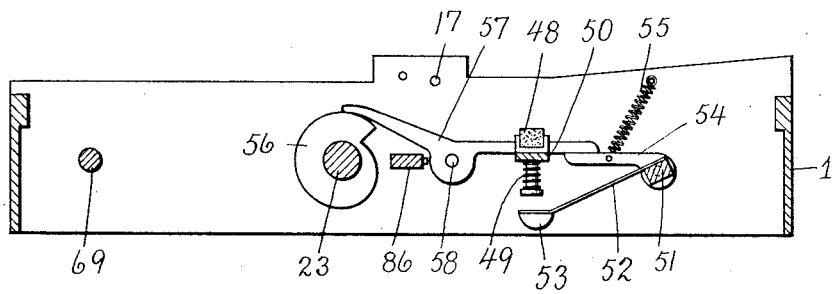
Figure 10:
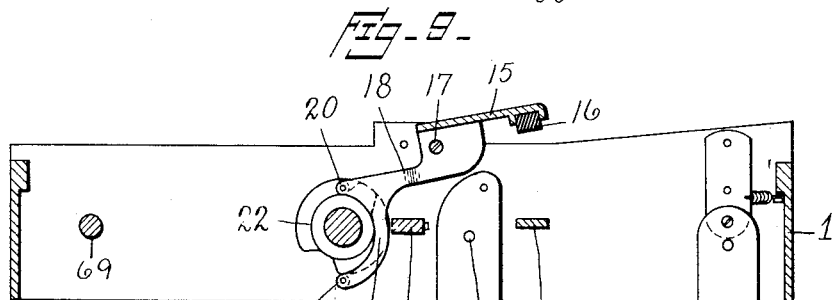
Figure 11:
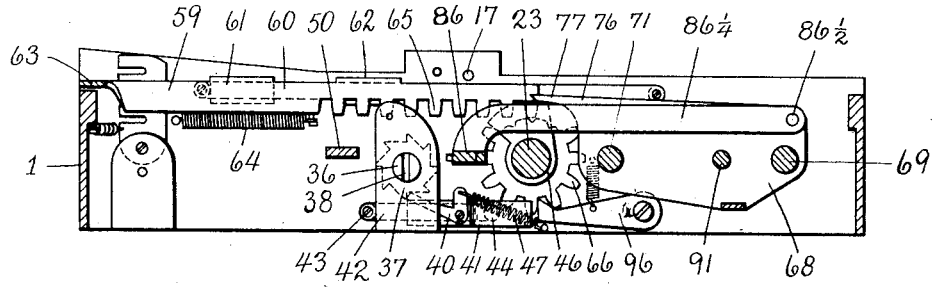
Figure 12:
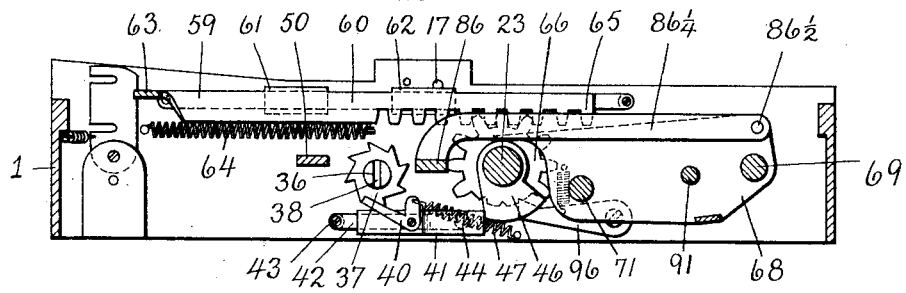
Figures 13, 14:
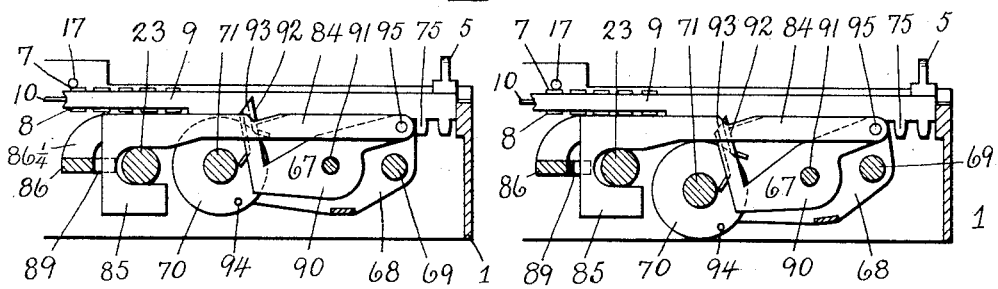
Figure 16:
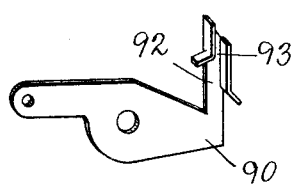
Figure 15:
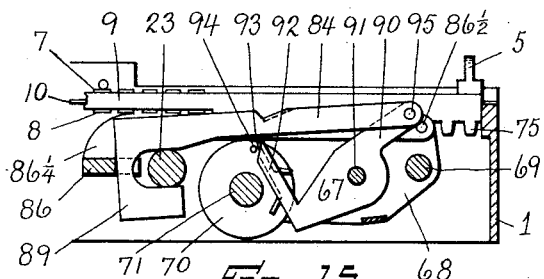

Figure 1 is a perspective view; Fig. 2, a top plan view of the cover of the case; Fig. 3, a top plan view; Fig. 4, a top plan view with the cover removed; Fig. 5, a top plan view with the slides removed; Fig. 6, a bottom view with the bottom of the case removed; Fig. 7, a vertical longitudinal section on the line A—B of Fig. 3, looking in the direction of the arrow; Fig. 8, a vertical longitudinal section on the line C—D of Fig. 1, looking in the direction of the arrow and showing the mechanism in the act of printing; Fig. 9, a detail view in elevation of the printing hammer mechanism; Fig. 10, a detail view in elevation of the platen and actuating means; Fig. 11, a longitudinal section on the line E—F of Fig. 5, looking in the direction indicated by the arrow and showing the position of the parts at the beginning of the cycle of the shaft, with the frame of the totalizing mechanism raised; Fig. 12, a longitudinal section on the line E—F of Fig. 5, looking in the direction indicated by the arrow and showing the position of the parts at the end of a half cycle of the shaft, the frame of the totalizing mechanism being lowered; Fig. 13, a detail view of the transfer setting mechanism, the totalizing mechanism being raised into mesh with the slides; Fig. 14, a detail view of the transfer setting mechanism, the totalizing mechanism being lowered out of mesh with the slides; Fig. 15, a detail view of the transfer setting mechanism, a transfer being set; Fig. 16, a perspective view of the lever of the transfer setting mechanism; Fig. 17, a detail view in perspective of a slide showing the upper surface; Fig. 18, a detail view in perspective of the slide, showing the under surface; Fig. 19, a detail view in perspective of a transfer collar; Fig. 20, a detail view in perspective of the pawl slide for feeding the record strip; Fig. 21, a detail view in perspective of the record-roll as printed; and, Fig. 22 is a receipted bill.

Similar reference numbers refer to similar parts throughout the several views of the drawings.

The mechanism of the device is contained within a compact, rectangular case, 1, preferably of pocket size, so as to be portable and easily handled by a collector going from house to house. It is thus provided that a payer may receive a receipt with the date and amount printed in his presence.

The cover, 2, of the case 1 is formed with a substantially flat surface pierced with openings, 3 and 4, (Figs. 1, 2).

The openings 3 are longitudinal slits, through which shanks of slide-operating buttons, 5, extend and along which they are moved in operation. At one end the openings 3 are enlarged, as at 6, where the characters of a totalizing counter are displayed. The openings 4 are preferably round holes, through which indices of printing types are displayed.

The receipt is printed through the instrumentality of printing mechanism, in which series of types, 7 and 8, (Figs. 17 and 18) are mounted upon flat bars or slides, 9, which in turn are slidably and flexibly mounted upon guides, 10, consisting of spring steel strips (Figs. 3, 4, 7 and 8) secured at each end of case 1. The series 7 are arranged longitudinally upon the upper surface of the slide, and the series 8 are similarly arranged upon the under surface of the slide, series 7 serving to print the data of the receipt on the bill and series 8 to print a duplicate record on a record-strip, 11, within the case of the machine. The rear end of slide 9 which is provided with the operating-button 5, is provided with index characters or indices, 12, corresponding to the types 7 and 8, by means of which the slide 9 is set preparatory to printing the desired data.

The cover 2 of the case 1 is formed with a transverse opening 13, through which the upper edge of a bill, 14, may be inserted. The opening 13 and the opening 4 are relatively so arranged that when an index character 12 is displayed through an opening 4 the corresponding type is in printing position under opening 13.

Over opening 13 is arranged a platen-plate, 15, which carries a platen, 16, consisting of a strip of rubber or other suitable material, against which the impression of the type may be made and which also provides a frictional surface for holding the paper of the bill 14 firmly in place during the act of printing. The platen-plate 15 is pivoted in the cover 2 at 17 (Figs. 7, 8, 11 and 12) and is provided with a cam lever extension (Figs. 8 and 10), 18, which in turn is provided with a cam yoke, 19, and cam rollers, 20 and 21.

The cam rollers (Figs. 5, 6, 8 and 10) are operated by a double cam, 22, mounted upon a main operating shaft, 23. Through these instrumentalities, when shaft 23 is rotated by means of a handle, 24, placed at the right-hand side of case 1, platen 16 is depressed, so as to firmly press paper 14 against type 7 and hold the paper there until the act of printing is finished, and the double cam 22 prevents the platen being depressed by external force and thus prevents the printing of the data on a receipt without at the same time printing a duplicate record on the record strip 11.

An inked ribbon, 25, (Figs. 7 and 8) is mounted on shafts, 26 and 27, and passes between platen 16 and type 7, which provides the ink for the impression upon the bill.

A gear wheel, 28, (Figs. 1, 3, 4, 5 and 7) is mounted upon shaft 27 and protrudes through an opening in cover 2 of the case. By means of this wheel the ribbon 25 may be shifted when required.

A record ribbon, 29, is similarly arranged in relation to types 8, underneath slides 9. This is mounted upon shafts, 30 and 31, and provided with suitable means for shifting to a fresh position when required, comprising a gear wheel, 32, meshing with gear 28.

Underneath ribbon 29 is mounted the record strip 11, comprising a web of paper, 33, upon journaled rolls, 34 and 35, in such a manner that it passes longitudinally of the case 1 under types 8. The paper 33 is wound upon roll 35 from the supply roll 34 so as to space the lines of the record. To this end the pivot (Figs. 5, 6, 11 and 12), 36, which carries and drives roll 35 is provided with a ratchet wheel, 37. We prefer to form the ends of pivot 36 with a slot, 38, (Figs. 11 and 12) and the roll 35 with a corresponding driver (Fig. 21), 39. A movable pawl, 40, is mounted and adapted to rotate roll 35 one step at each complete cycle of operating shaft 23. Pawl 40 is mounted upon a slide, 41, which in turn is slidably mounted upon a guide bar, 42, secured to the case at each end, 43 and 44. The slide 41 is mounted upon guide bar 42 by means of a T slot, 45, (Fig. 20) with which it is provided and is pushed forward to feed paper 33 by a cam, 46, mounted upon operating shaft 23. A spring, 47, attached to pawl 40 draws the pawl and the slide back to normal position when released from cam 46, and pawl 40 falls in behind the next tooth on ratchet wheel 37.

When the bill 14 has been placed in position under platen 16 and strip 11 has been properly fed forward and shaft 23 has been rotated to the point where platen 16 is depressed upon the paper 14, the impression is taken both upon the bill and upon the record strip by a hammer blow. For this purpose a series of platens 48, are mounted upon vertical plungers, 49, which are slidably mounted in a stationary bar, 50. A platen 48 is placed under each of the slides 9 in such position that it registers with the type 8 indicated by the corresponding index character 12. A rock-shaft, 51, is mounted across the case, and from this extend spring arms, 52, which are provided at their free ends with hammers, 53. Shaft 51 is provided at its left-hand end (Figs. 5, 8 and 9) with an arm, 54, which is normally drawn upward by a spring, 55, so that when the arm 54 is free it rocks shaft 51, and the hammers 53 are caused to strike plungers 49 and raise platens 48, causing them in turn to strike paper 33 and ribbon 29 against type 8 and also to drive slide 9 which is mounted on a yielding, flexible guide upward and type 7 against ribbon 25, paper 14, and platen 16, thus making the impression of the type both upon paper 33 and receipt 14 at the same blow.

The hammers 53 (Fig. 9) are operated through a cam, 56, mounted upon shaft 23, through the instrumentality of a lever, 57, pivoted on a stud, 58, on the left-hand side of the case. When cam 56 is rotated till it permits one end of lever 57 to drop the opposite end of the lever releases arm 54 suddenly and spring 55 operates the hammers 53.

After each printing and recording operation the slides 9 are all returned to the initial or zero position. This is accomplished through an L-shaped bar, 59, (Figs. 4, 7, 11 and 12) comprising a leg, 60, which extends longitudinally of the case 1 on the right-hand side and is slidably mounted in blocks 61 and 62, secured on the side of the case, and a transverse leg, 63, which extends across the front portion of the case under cover 2, slides over the surface of spring guides 10, and is adapted to engage, in its backward movement, the front end of slides 9. The bar 59 is held normally in its retracted position (Figs. 4, 7 and 11) by a tension spring, 64, which is attached thereto at one end and to the right-hand side of the case at its opposite end (Figs. 11 and 12). The leg 60 is provided at its rear end with a rack, 65, which engages a pinion, 66, mounted on shaft 23. Some of the teeth of pinion 66 are removed, so that the bar 59 is drawn backward during a portion of the revolution of the shaft and released to be retracted by spring 64 when the cycle of the shaft is completed and the last tooth of the pinion has passed the rack. The portion of the pinion which is without teeth passes under rack 65 during the part of the revolution of shaft 23 when the printing is being done. Immediately after this, platen 16 is lifted, and bar 59 and pinion 66 operate to push those slides 9 which served to print the amount receipted, backward to the zero position. But it will be observed that leg 63 does not extend (Fig. 4) sufficiently far across the machine to engage the date slides. The date slides are set up each month and day of the month and left so until a change is required. It will thus be seen that a given amount can be printed upon the receipt and the record strip only once with a single setting up of the slides. Thus provision is made to compel the operation of the totalizing counter for each amount that is printed.

The total of the receipts recorded upon the record strip 11 is at all times shown by a counter, 67. This comprises a frame, 68, which is pivoted in the case 1 on a transverse bar, 69, and number wheels, 70, mounted upon a shaft, 71, which extends across the free end of frame 68. The frame being pivoted upon bar 69, adapts the number wheels 70 to swing vertically. The counter 67 is held normally depressed by a spring, 71½ (Figs. 5 and 6). Each of the number wheels has rigidly attached to it a pinion, 72, by means of which the number wheel is turned. A lining detent, 73, is mounted in frame 68 in operative relation to each of the pinions 72 and pressed by a spring, 74, into engagement with the teeth of the pinion. These lining detents serve to hold the pinions and their number wheels stationary when not actuated by some external force and prevent their spinning.

Each of the slides 9 is provided on its under surface with a rack, 75, adapted to mesh with and turn a pinion 72. Pinion 72 is formed with ten teeth, or a tooth for each digit of the number wheel. The racks 75 are formed of the same pitch as the pinions and the indices and types upon slides 9 are correspondingly arranged so that when an index character shows in an opening 4 of cover 2 rack 75 and pinion 72 are in proper relation to mesh perfectly.

Counter frame 68 is provided on its right-hand side (Figs. 5 and 11) with an extension, 76, provided on its end with a cam plate, 77, which engages cam 46 mounted upon operating shaft 23. By this means frame 68 is swung vertically upon its pivot bar 69. Cam 46 is so timed that at the end of the rotation of shaft 23 the frame 68 is held in the elevated position. It will be understood that in this position pinions 72 are elevated into mesh with racks 75. Therefore, when slides 9 are moved to set up an amount preparatory to receipting a bill, pinions 72 and their number wheels 70 are correspondingly turned (Fig. 7).

When the operator begins to rotate shaft 23 (Fig. 8) the first effect is to depress platen 16 upon the bill to be receipted and upon the type of slides 9. This holds the slides firmly in the position in which they were set up against movement by means of slide operating buttons 5 or otherwise. The next effect of the rotation of shaft 23 is to cause (Fig. 9) cam 56 to trip the printing hammers 53 and print the receipt and the record. Immediately following this (Fig. 11) cam 46 drops the counter frame and the pinions 72 out of mesh with racks 75. In this position of the counter the number wheels can no longer be affected by any movement of slides 9.

At the same time (Fig. 10) platen 16 is raised and slides 9 are released.

The further movement of shaft 23 serves to effect transfers of tens in the counter, the return of slides 9 to the zero position through the instrumentality of bar 59, and to return the transfer tripping bars to neutral position.

The transfer of tens on the counter is effected through the following instrumentalities: Upon shaft 23, at suitable intervals, are slidably keyed collars, 78, 79, 80 and 81. Each of these collars is provided with a transfer tooth, 82, successively arranged upon the shaft, in spiral relation, in such a manner that if all the teeth were brought into the same plane they would form a pinion of the same pitch as pinions 72. The collars are normally pressed toward the right on shaft 23 by springs, 83, and are limited and governed in their motion on the shaft by L-shaped, notched transfer tripping bars, 84. Each bar 84 is provided at its front end with a projection, 85, of angular cross section, lying in a vertical plane at right angles to the plane of the bar. A bar (Figs. 5 and 6), 86, is placed across the case near shaft 23 and in parallel relation thereto. Bar 86 is mounted to slide from and toward shaft 23 with slight amplitude, and is pivotally connected (Figs. 5, 6, 11, 12, 13, 14 and 15) with counterframe 68 by bars, 86¼, pivoted at 86½, in order that bars 84 and 86 may be in the same relative position when counter 67 is elevated and depressed. It is formed with extensions, 87, which in turn are provided each with two vertical notches, 88 and 89, corresponding in shape to and adapted to receive the projections 85 of bars 84. The notched extensions 87 project toward the rear of the machine. Each notch 88 is arranged farther toward the rear of the machine than notch 89. The projections 85 are adapted to fit notches 88 and 89 and to slide into each from the other alternately as hereinafter described.

It will now be understood that when bar 84 is pulled, extension 85 will slide out of notch 89 and, the bar being pressed to the right by spring 83 and collar 78, for example, will sink into notch 88. In doing this bar 84 will assume a position in a plane farther toward the right and therefore transfer tooth 82 will change to a different plane correspondingly. It will be observed (Fig. 5) that the tooth 82 farthest to the right of the machine, for example, when shaft 23 is rotated, will engage one of the teeth of pinion 72, because bar 84, being pushed forward into notch 89, holds collar 78 in the left-hand position. Therefore if shaft 23 is rotated tooth 82 of collar 78 will turn pinion 72 one tooth and advance its number wheel to the next higher number. This being the tens wheel, a transfer from the units will be effected. In the event that bar 84 is pulled projection 85 slides into notch 88, permits collar 79, for example, and its transfer tooth to slide to the right, where it is out of the plane of corresponding pinion 72, and, therefore, if shaft 23 is rotated tooth 82 will miss the pinion and no transfer will be effected.

The transfer setting bars 84 are actuated as follows: At each number wheel 70 (Figs. 5, 6, 13, 14 and 15) is provided a transfer lever, 90, pivoted on a bar, 91, mounted in frame 68. The lever 90 is formed with an angular extension, 92, which is provided with a channel, 93, on its right-hand side. The extension 92 and its channel extends between a number wheel and the pinion of its neighbor to the left into the path of a pin or stud, 94, which extends from the left-hand face of the number wheel. The stud 94 is located relatively between the characters 1 and 0 on the periphery of the number wheel, so that it engages channel 93 while the number wheel shows the space between 9 and 0.

It will be observed (Figs. 14 and 15) that when the number wheel passes from 9 to 0 stud 94 will engage the outer wall of channel 93, or the wall farthest from pivot 91, and rock lever 90 downward to the position shown in Fig. 15. In this case lever 90, being pivotally connected to bar 84 at 95, will push bar 84 to the transfer tripping position shown at collar 78 in Fig. 5. It will be understood that if it is found that in setting up a number wheel an error has been made, by drawing back button 5 and corresponding slide 9 stud 94 will be rotated in the direction from 0 to 9, will engage the inner side of channel 93, rock lever 90 upward to the position shown in Fig. 14, and restore bar 84 and collar 78 to the nontripping position. It is obvious therefore that slides 9 may be moved back and forth at will while an amount is being set up and no erroneous transfer will be permanently set, but after the operator has begun to rotate shaft 23 and has advanced to the point where counter 67 is dropped out of engagement with slides 9 the transfers previously set up will be permanently effected by the further rotation of the shaft, that is, after the receipt and the record have been printed.

It may be added here that a pawl, 96, which engages pinion 66 prevents backward rotation of shaft 23 and therefore compels the completion of the cycle of shaft 23 and the totalizing operation before a new amount can be set up and printed.

A hook, 97, (Fig. 5) is pivoted on bar 86 and extends over the periphery of shaft 23. A pin or stud, 98, projects from shaft 23 in the path of hook 97, in such a position relative to the circumference of the shaft that it engages the hook at the completion of a cycle of the shaft and therefore stops the shaft at this point.

An L-shaped lever, 99, is also pivoted on bar 86 in proximity to hook 97, having a long arm extending toward the right over bar 86 and a short arm extending over the periphery of shaft 23.

A stud, 100, (Fig. 5) extends from shaft 23 in such a position relative to the circumference of the shaft that it engages the short arm of lever 99 just before the completion of the cycle of the shaft and releases it just before stud 98 engages hook 97. When stud 100 engages the short arm of lever 99 during its further movement it throws the long arm toward and into engagement with the rear end of transfer setting bars 84 and pushes any that may be engaging notch 89 over to notch 88, so that all the transfer collars 78-81 are thrown to the neutral plane and the number wheels are in condition for new transfers to be set up.

A compression spring, 101, normally presses hook 97 toward the right out of the path of stud 98, but when lever 99 is operated by stud 100 it pushes hook 97, which normally rests against the short arm of lever 99, toward the left into the path of stud 98 and holds it there until hook 97 fully engages the stud and is held in engagement until shaft 23 is given a slight backward rotation, when hook 97 flies to the right and releases the shaft. It is necessary, therefore before beginning the forward rotation of shaft 23 to first give it a slight backward movement, when it may be given a complete forward cycle.

It will be appreciated that the device being small and compact and comparatively simple in its construction may be comparatively cheaply manufactured and thus within the reach of many, and may be easily carried about in the pocket or in the hands after the manner of a pocket camera or book. It greatly facilitates the keeping of accounts and obviates the necessity of much writing.

Having thus described our invention, so that any one skilled in the art pertaining thereto may understand its construction and any one of ordinary intelligence may readily understand its use, we claim—

1. A receipting recorder, comprising a case, slides mounted in said case, buttons for manipulating said slides, a platen to receive a bill to be receipted, means for operating said platen to engage and hold a bill to be receipted and hold said slides at times, means for effecting an impression of said types on a bill to be receipted, an indicating totalizing counter mounted in said case, and means for directly, temporarily, operatively connecting said counter with said slides, whereby the amount printed on a bill receipted is transferred to said counter.

2. In a receipting recorder, a case, adjustable slides having fixed printing types thereon, a clamping platen for receiving a bill or other paper to be receipted and locking said slides pivotally mounted in said case, an operating shaft, and means on said operating shaft for depressing said platen to clamp the bill to be receipted and lock said slides.

3. A receipting recorder, comprising a case, adjustable slides slidably mounted on flexible guides in said case, index characters on said slides by which said slides may be set, printing types on the upper surface of said slides for receipting a bill, printing characters on the under surface of said slides for making a record of data printed on a bill receipted, and means for effecting the impression of said characters on a bill to be receipted and of a record.

4. A receipting recorder, comprising a case, flexible guides, printing types adjustably mounted on said guides, buttons for setting up said printing types to print certain data, means for receiving a bill or other paper to be receipted, a clamping platen upon which to make an impression mounted in said case, means for effecting an impression of said types, an indicating totalizing counter, and means for operatively connecting said counter with said printing types, whereby the amount printed is transferred to said counter.

5. A receipting recorder, comprising a case, operating slides slidably mounted on flexible guides in said case, index characters and printing types mounted on said slides, a totalizing counter pivotally mounted in said case, said counter being provided with number wheels rotatably mounted, pinions mounted on said number wheels, racks mounted on said slides, said pinions being adapted to mesh with said racks so that said counter is operated directly by said slides, and means for elevating and depressing said counter and thus bringing it into and out of gear with said slides.

6. In a receipting recorder, a case, adjustable slides provided with printing types, printing means for effecting an impression of said types on a bill to be receipted and on a record strip, an indicating totalizing counter pivotally mounted in said case, means for meshing said counter with said slides whereby the amounts to be printed are transferred to said counter, an operating shaft, means on said operating shaft for actuating said printing means, and means on said operating shaft for actuating said counter.

7. In a receipting recorder, a case, adjustable slides mounted on flexible guides in said case, printing types mounted on said slides, means for taking an impression from said types, an operating shaft rotatably mounted in said case, an indicating totalizing counter mounted in said case, said counter being directly connected with said operating shaft and directly connected with said slides at times, means on said operating shaft for actuating said means for taking an impression, means on said operating shaft for elevating said counter into mesh with said slides when they are to be manipulated and dropping said counter out of mesh with said slides when said impression means are in operation.

8. In a receipting recorder, a case, slides mounted in said case, and provided with a rack, printing means mounted in said case, an indicating totalizing counter mounted in said case directly connected with said slides while amounts are being set up and disconnected from said slides while transfers are being effected, and an operating shaft mounted in said case and directly connected with said counter, said counter being provided with number wheels and gears which are adapted to mesh with the racks on said slides at times, transfer setting levers, transfer setting bars, and said operating shaft being provided with transfer effecting teeth.

9. A receipting recorder, comprising a case, slides mounted in said case, printing types on said slides, manipulating buttons mounted on said slides, means for printing from said types, means for receiving and firmly holding a bill to be receipted, an operating shaft, means connected with said operating shaft for spacing a record strip, an indicating totalizing counter directly connected with said slides and said operating shaft, and means connected with said shaft for returning said slides to initial position after each printing and recording cycle.

10. In a receipting recorder, a case, slides mounted in said case, and provided with a rack, printing means mounted in said case, a counter mounted in said case operatively connected with said slides at times, and an operating shaft mounted in said case and operatively connected with said counter, said counter being provided with number wheels and gears which are adapted to mesh with the racks on said slides at times, transfer setting levers, transfer setting bars, said operating shaft being provided with transfer effecting teeth, and means mounted in said case and connected with said operating shaft for returning said transfer setting bars to neutral position.

11. In a receipting recorder, a case, a flexible guide mounted in said case, and a thin flat slide mounted on said guide, said slide being provided with duplicate series of printing types, the one below and the other above said guide, a rack on the lower side, index characters on the upper side, and an operating button on the upper side.

12. In a receipting recorder, a case, a clamping platen mounted on said case, a thin flat slide flexibly mounted in said case, bearing duplicate series of printing types on its sides, an inking ribbon trained between said platen and said slide, and an impression hammer underneath said slide, whereby a bill placed under said platen is clamped and held while said impression hammer drives the type of said slide against it and prints the receipting data on the bill.

13. In a receipting recorder, a case, a series of slides mounted in said case and provided with operating buttons, printing types mounted on the sides of said slides, a single operating shaft mounted in said case, a rack and bar for returning said slides positively to initial position, and a gear mounted on said operating shaft and meshing with said rack.

14. In a receipting recorder, a case, printing slides mounted in said case, an indicating totalizing counter mounted in said case, an operating shaft mounted in said case, said counter being directly connected with said operating shaft, said counter being directly connected with said slides while said slides are being set and disconnected therefrom while transfers are being effected, and independent transfer setting means for each section provided in said counter.

15. In a receipting recorder, a case, indicating means for setting up an amount to be receipted on a bill, operating means, an indicating totalizing counter operatively and directly connected with said setting-up means while amounts are being set up, independent transfer-setting means for each section of said counter, means for returning said setting-up means to initial position positively operated by said operating means, and means for returning said transfer setting means positively to neutral position connected with said operating means.

ARTHUR WARD HAYES.
CLARENCE D. STEVENS.

Witnesses:
IRA F. OMWAKE,
W. B. McLAURIN.

Copies of this patent may be obtained for five cents each, by addressing the "Commissioner of Patents, Washington, D. C."